US010489752B2

(12) United States Patent
Korsedal, IV et al.

(10) Patent No.: US 10,489,752 B2
(45) Date of Patent: Nov. 26, 2019

(54) FAILURE MODE RANKING IN AN ASSET MANAGEMENT SYSTEM

(71) Applicant: General Electric Company, Schenectady, NY (US)

(72) Inventors: John Robert Korsedal, IV, Greenville, SC (US); Carlos Andres Hein, Greenville, SC (US); Christopher D. Higgins, Greenville, SC (US); Marc Gavin Lindenmuth, Atlanta, GA (US); Molli Anne Dill, Roswell, GA (US); Yan Zhao, Katy, TX (US)

(73) Assignee: General Electric Company, Schenectady, NY (US)

( * ) Notice: Subject to any disclaimer, the term of this patent is extended or adjusted under 35 U.S.C. 154(b) by 534 days.

(21) Appl. No.: 15/248,036

(22) Filed: Aug. 26, 2016

(65) Prior Publication Data

US 2018/0060832 A1    Mar. 1, 2018

(51) Int. Cl.
*G06Q 10/00* (2012.01)
*G01M 99/00* (2011.01)
*G06Q 10/06* (2012.01)
*G05B 23/02* (2006.01)

(52) U.S. Cl.
CPC .......... *G06Q 10/20* (2013.01); *G01M 99/005* (2013.01); *G05B 23/0278* (2013.01); *G05B 23/0283* (2013.01); *G06Q 10/0635* (2013.01)

(58) Field of Classification Search
CPC ...................................................... G06Q 10/20
See application file for complete search history.

(56) References Cited

U.S. PATENT DOCUMENTS

| | | | |
|---|---|---|---|
| 6,556,924 B1* | 4/2003 | Kariyawasam | G06Q 10/04 285/15 |
| 8,442,853 B2 | 5/2013 | Abbott | |
| 8,592,217 B2 | 11/2013 | Eckhardt | |
| 2002/0007289 A1* | 1/2002 | Malin | G06Q 10/06 705/4 |
| 2008/0140435 A1* | 6/2008 | Arakawa | E02F 9/26 705/1.1 |
| 2009/0002148 A1* | 1/2009 | Horvitz | G06Q 10/047 340/514 |
| 2009/0106327 A1* | 4/2009 | Dilman | G06F 11/0727 |
| 2014/0089208 A1* | 3/2014 | Humble | G06Q 10/20 705/305 |
| 2016/0196701 A1* | 7/2016 | Strother | G07C 5/008 701/29.3 |
| 2016/0342496 A1* | 11/2016 | Cahill | G06F 11/3013 |
| 2017/0186249 A1* | 6/2017 | Bandy | G06Q 10/20 |
| 2018/0096084 A1* | 4/2018 | Sheldon | G06Q 10/20 |

* cited by examiner

*Primary Examiner* — Michael J Dalbo
(74) *Attorney, Agent, or Firm* — Theodoros Stamatiadis; Hoffman Warnick LLC

(57) ABSTRACT

This disclosure provides systems for using failure mode ranking in an asset management system to generate asset maintenance outputs. Operational data, failure mode models, and configuration data for an asset, such as a complex electromechanical system, are related to failure prevention analytics configurations through failure mode rankings to enable the asset management system to reduce a future ranking of potential failure modes by changing the present configuration of the asset to include a recommended failure prevention analytics configuration.

20 Claims, 4 Drawing Sheets

FAILURE MODE RANKING IN AN ASSET MANAGEMENT SYSTEM

BACKGROUND

The disclosure relates generally to asset management systems, and more particularly, to systems using operational data to manage complex electromechanical assets.

Power generation systems and other complex machines include a large number of mechanical and electrical components, including an increasing number of sensors for detecting operational characteristics and anomalies. These components may be subject to stress and wear, particularly in applications and environments that include motion, pressure, and heat. Managing the operational performance, maintenance, and equipment investments over the life of such a system is challenging and increasingly relies on one or more computing systems for asset management.

Conventional systems and methods exist to monitor the performance and operation of complex machines, sometimes referred to as assets. For example, a power generation system may be equipped with sensors for capturing inputs, outputs, and other operational parameters. Some systems may also be equipped with one or more additional sensors for monitoring specific parameters or components for anomaly detection. The various sensors communicate with one or more processing subsystems, which may, in turn, communicate with one or more computing systems for aggregating sensor data for use in asset management. Asset management systems may employ a variety of computing systems and communication networks to manage the operation, monitoring, and maintenance of one or more assets from which they receive operational and other data.

SUMMARY

A first aspect of this disclosure provides systems for using failure mode ranking in an asset management system to generate asset maintenance outputs. Operational data, failure mode models, and configuration data for an asset, such as a complex electromechanical system, are related to failure prevention analytics configurations through failure mode rankings to enable the asset management system to reduce a future ranking of potential failure modes by changing the present configuration of the asset to include a recommended failure prevention analytics configuration.

A second aspect of the disclosure provides a system comprising a plurality of sensing devices configured to generate operational data indicative of a plurality of operating parameters for an asset. A computing system is in communication with the plurality of sensing devices for receiving the operational data. A plurality of failure mode models are stored in at least one data repository accessible to the computing system and describe potential failure modes of a class of assets including the asset. Asset configuration data is stored in at least one data repository accessible to the computing system and describe at least a present configuration of the asset. An analytics library is stored in at least one data repository accessible to the computing system and provides a plurality of failure prevention analytics configurations associated with the plurality of failure mode models. A failure mode ranking system is accessed by the computing system and uses the operational data, the asset configuration data, and the analytics library to rank a plurality of potential failure modes by a severity of failure and a related failure prevention analytics configuration. An asset maintenance output is generated by the computing system using the failure mode ranking system to reduce a future ranking of at least one of the plurality of potential failure modes by changing the present configuration of the asset to include a recommended failure prevention analytics configuration.

A third aspect of the disclosure provides a computing system comprising a relational database structure that includes operational data elements, failure mode model elements, asset configuration data elements, failure prevention analytics configuration elements, failure mode ranking elements, and a plurality of relationships among those elements. A plurality of operational data elements are stored in at least one data repository accessible to the computing system and indicate a plurality of operating parameters for an asset. A plurality of failure mode model elements are stored in at least one data repository accessible to the computing system and describe potential failure modes of a class of assets including the asset. A plurality of asset configuration data elements are stored in at least one data repository accessible to the computing system and describe at least a present configuration of the asset. A plurality of failure prevention analytics configuration elements are stored in at least one data repository accessible to the computing system and describe detection and prevention resources associated with the class of assets including the asset. A plurality of failure mode ranking elements are stored in at least one data repository accessible to the computing system and rank a plurality of potential failure modes by a severity of failure and a related failure prevention analytics configuration. An asset management system is implemented by the computing system and uses the relational database structure to generate an asset maintenance output reducing a future ranking of at least one of the plurality of potential failure modes by changing the present configuration of the asset to include a recommended failure prevention analytics configuration.

A fourth aspect of the disclosure provides an asset manage system operating in a memory of a computing system. An asset operations receiving system is configured to receive operational data indicative of a plurality of operating parameters for an asset. An asset failure mode model system is configured to access a plurality of failure mode models stored in at least one data repository accessible to the computing system and describing potential failure modes of a class of assets including the asset. A present configuration system is configured to access asset configuration data stored in at least one data repository accessible to the computing system and describes at least a present configuration of the asset. A failure mode ranking system is configured to access a plurality of failure prevention analytics configurations stored in the at least one data repository accessible to the computing system and uses the operational data, the asset configuration data, and the plurality of failure prevention analytics configurations to rank a plurality of potential failure modes by a severity of failure and a related failure prevention analytics configuration. The asset management system generates an asset maintenance output using the failure mode ranking system to reduce a future ranking of at least one of the plurality of potential failure modes by changing the present configuration of the asset to include a recommended failure prevention analytics configuration.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As indicated above, this disclosure provides systems for using failure mode ranking in an asset management system to generate asset maintenance outputs. More specifically, operational data, failure mode models, and configuration data for an asset, such as a complex electromechanical system, are related to failure prevention analytics configurations through failure mode rankings to enable the asset management system to reduce a future ranking of potential failure modes by changing the present configuration of the asset to include a recommended failure prevention analytics configuration. The described relational data structures may improve the operation and function of asset management systems and the computing systems hosting them by connecting previously isolated data resources and may enable ranking of failure modes to recommend modifications to asset configurations, sensor packages, maintenance schedules, and asset operations to align with specific analytics options.

Figure 1:
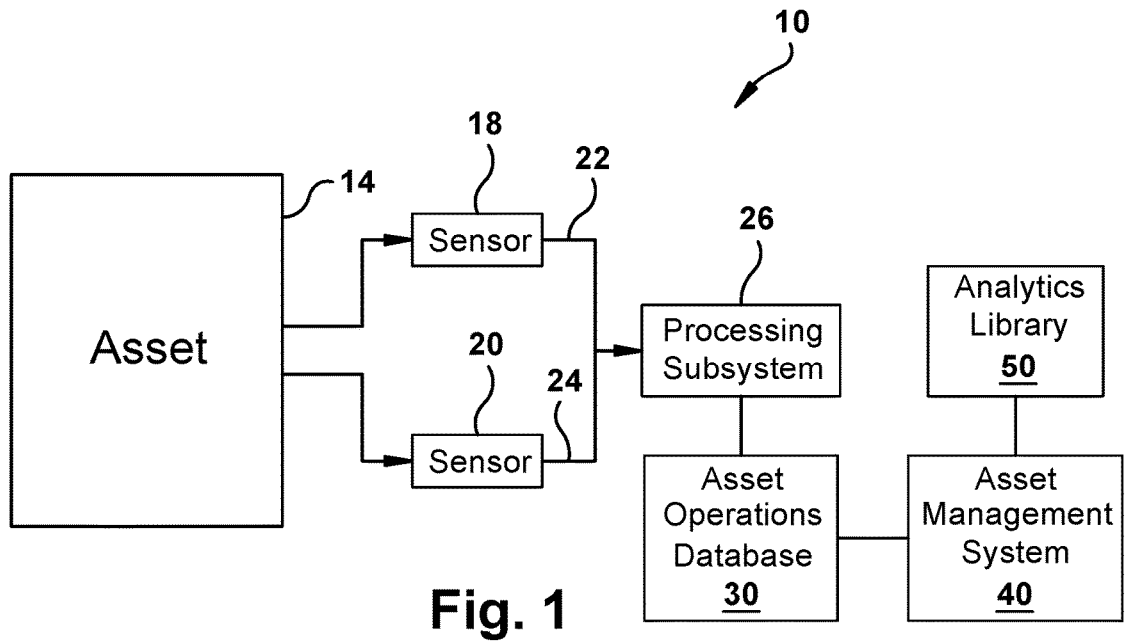
FIG. 1 shows a diagram of an example system for managing an asset.

FIG. 1 shows a diagram of an example system 10 for managing an asset 14 using an asset management system 40. Asset 14 may be any complex machine with multiple electromechanical subsystems and operating parameters that may be associated with operational efficiency and component or system failure. These assets may lend themselves to the development of various analytics, including lifing models that track changes in operational characteristics and other data over the operational lifetime of an asset in the field, anomaly detection models for identifying event-based changes (such as atypical component wear, component failure, use/load disruptions, user error, etc.), and other analytics for using data to understand and predict behavior of the asset. For example, asset 14 may include various turbomachines, compressors, gas turbines, steam turbines, or generators. Asset 14 may be a component in a larger system, such as a power generation facility, and data regarding its configuration and major operational parameters, such as inputs, outputs, operating time, and environmental characteristics may be available from a variety of data sources.

In the example shown in FIG. 1, asset 14 has been equipped with sensors 18, 20 to enable the collection of additional data directly from asset 14. Sensors 18, 20 may be sensors integrated into asset 14 during assembly or may include sensors installed as a factory upgrade or as part of a field installation (during initial deployment or a subsequent upgrade). For example, sensors 18, 20 may include electrical sensors (current, potential, magnetic, radio, etc.), particle sensors (humidity, chemical, etc.), flow sensors, pressure sensors, thermal sensors, optical sensors, acoustic sensors, and more. Sensors 18, 20 may relate to a specific operational characteristics of asset 14 or may target the operation or integrity of a specific component or subsystem within asset 14. Sensors 18, 20 may be attached directly to asset 14 or proximate to it such that they may take detect a relevant characteristic from asset 14 directly or indirectly. Sensors 18, 20 generate signals 22, 24 representing the sensed characteristics related to asset 14. Most commonly, sensors 18, 20 generate an analog electrical signal of known characteristics correlating to the property and range being sensed. In some implementations, digital sensors may be used (generally including onboard analog/digital processing) and signals 22, 24 may be streams of digital data provided through a wired or wireless data connection using known digital communication protocols. Though system 10 shows two sensing devices 18, 20, system 10 may include an optimal number of sensing devices based upon the size of the asset 14, the variety of characteristics to be sensed, the number and variety of subsystems or components of interest, and the precision expected in monitoring the characteristics.

System 10 further includes a processing subsystem 26 that receives signals 22, 24 from sensing devices 18, 20 for generating more generally usable data from signals 22, 24 and providing an interface to other systems, which may include a user interface. Processing subsystem 26 may include various components, such as microprocessors, coprocessors, memory/media elements for data storage, software instructions, wired/wireless communication channels, user interfaces, and other data processing components. The various memory/media elements for data storage, including storage of software executables, may be one or more varieties of computing readable media, such as, but not limited to, any combination of volatile memory (e.g., RAM, DRAM, SRAM, etc.), non-volatile memory (e.g., solid state drives, hard drives, optical media, magnetic tapes, etc.), and or other memory types. Any possible variation of data storage and processing configurations, including mass market computing devices (e.g., personal computers, laptops, tablets, smartphones, etc.) running appropriate software applications, will be appreciated by one of ordinary skill in the art. Processing subsystem 26 may also include or interface with more specialized intermediate devices for receiving signals 22, 24. For example, the intermediate device may include an amplifier, an interface unit, a data acquisition system, and the like for preprocessing. The preprocessing may increase the strength and quality of signals 22, 24. In some embodiments, preprocessing may include conversion from analog electrical signals to digital signals and/or integration and separation of signals into signals directly correlating to specific components or characteristics. Processing subsystem 26 may be collocated with asset 14 or may be at a remote location.

In the example embodiment shown, the processing subsystem 26 includes or interfaces with an asset operations database 30. Asset operations database 30 is a data repository for aggregating operational data related to asset 14. Asset operations database 30 may include a variety of data aggregated from a variety of data sources, including but not limited to the sensor data received and processed by processing subsystem 26. For example, in addition to sensor data, the operations data in asset operations database 30 may include inputs, outputs, operating time, and environmental characteristics may be available from other sensors, associated systems, or proprietary or public databases.

The operations data included in asset operations database 30 may then be available to asset management system 40. Asset management system 40 may provide data, functions, communications, and user interface for controlling and/or monitoring the operations and performance of asset 14, as well as managing maintenance and upgrades for asset 14. In one embodiment, the asset management system 40 integrates an analytics library 50 with operations data from asset operations database 30 through a relational database structure to rank failure modes and generate asset maintenance output, such as recommendations for upgrades to better enable one or more failure prevention analytics from analytics library 50. An example embodiment of asset operations database 30, asset management system 40, and analytics library 50 will be more fully described below with regard to FIG. 3.

Figure 2:
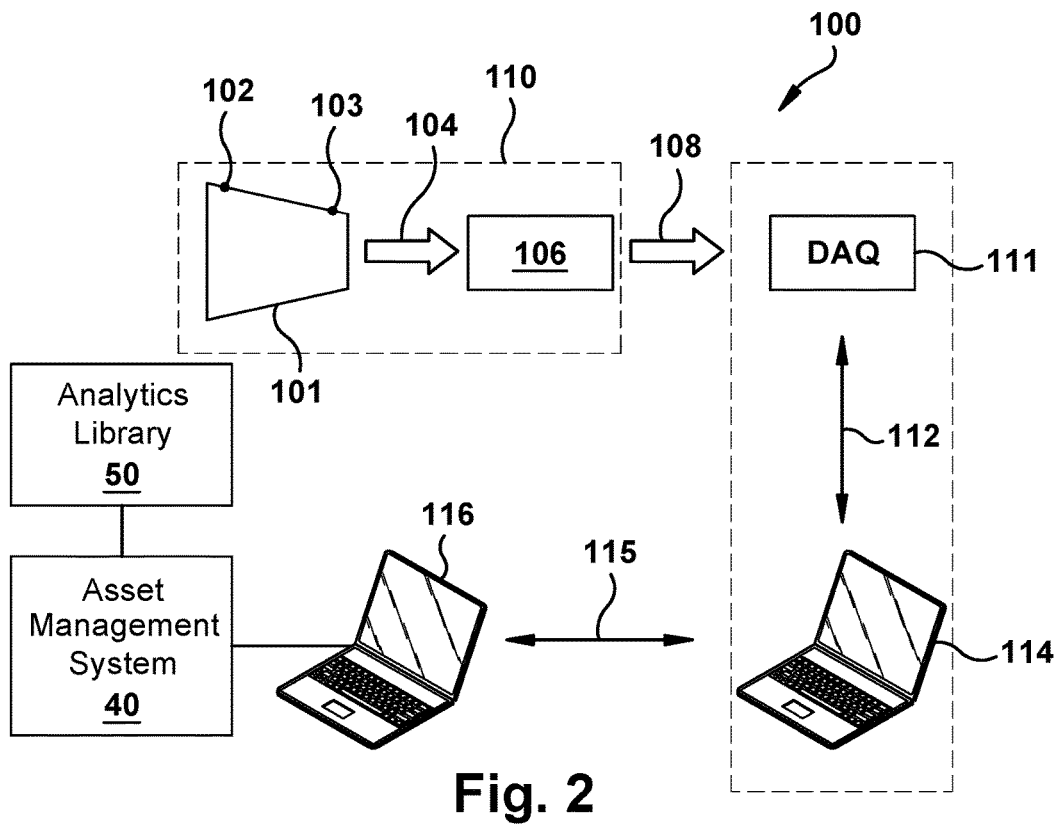
FIG. 2 shows a diagram of another example system for managing an asset.

FIG. 2 is a diagram of an example system 100 for managing asset 101 using asset management system 40 and analytics library 50. System 100 illustrates preprocessing of signals by intermediate devices before the signals reach a processing subsystem and the use of networked computing systems for managing the operations data used by asset management system 40. The system 100 includes a plurality of sensing devices 102, 103 that are mounted on the outer surface of asset 101. Sensing devices 102, 103 generate signals 104 that are representative of operational characteristics of interest related to asset 101. Sensing devices 102, 103 may be physically coupled or otherwise in communication with an intermediate device 106. Intermediate device 106 may be an amplification device located in asset location 110 for the asset 101. In alternative embodiments, the intermediate device 106 may be located outside the asset location 110. The intermediate device 106 may be used to amplify, condition, process, or otherwise improve signals 104 to generate improved signals 108.

System 100, further includes a data acquisition system (DAQ) 111. DAQ 111 is operationally coupled with the intermediate device 106 to receive improved signals 108. DAQ 111 receives improved signals 108 and converts them into digital signals 112. In one embodiment, DAQ 111 may remove noise from improved AE signals 108 before converting them into digital signals 112. System 100 further includes a first processing subsystem 114, embodied in a general purpose computing system (laptop) in the example shown. First processing subsystem 114 may be operationally associated with DAQ 111. In some embodiments, first processing subsystem 114 is located in the vicinity of DAQ 111. In another embodiment, DAQ 111 may be a part of first processing subsystem 114. In alternative embodiments, first processing subsystem 114 may perform the functions of DAQ 111 based on receiving the improved signals directly from intermediate device 106 and system 100 may operate without a separate DAQ.

First processing subsystem 114 receives digital signal 112 from DAQ 111 in the form of a real-time digital data stream, near real-time batches, or other periodic transfers of data with associated timing information. First processing subsystem 114 processes digital signals 112 to store them in a desired data format. In some embodiments, first processing subsystem 114 may further process digital signals 112 to normalize, identify derivative characteristics and events, or otherwise generate additional operational data regarding asset 101. System 100 further includes a second processing subsystem 116 that is located at a remote location with respect to the locations of asset 101 and first processing subsystem 114. Second processing subsystem 116 is operatively associated with first processing subsystem 114 via a wired or wireless communication medium, such as a wireless internet connection.

Second processing subsystem 116 is configured to enable a user to access first processing subsystem 114. Therefore, second processing subsystem 116 may be used by a user to manage asset 14 from a remote location. Particularly, second processing subsystem 116 enables a user to review operational data generated by the first processing subsystem 114. In the example shown, second processing subsystem 116 is associated with asset management system 40 and analytics library 50, enabling second processing subsystem 116 to perform asset management functions for which first processing subsystem 114 is not enabled. In one embodiment, second processing subsystem 116 selectively accesses operational data 115 stored on first processing subsystem 114 and acting as an asset operations database.

Figure 3:
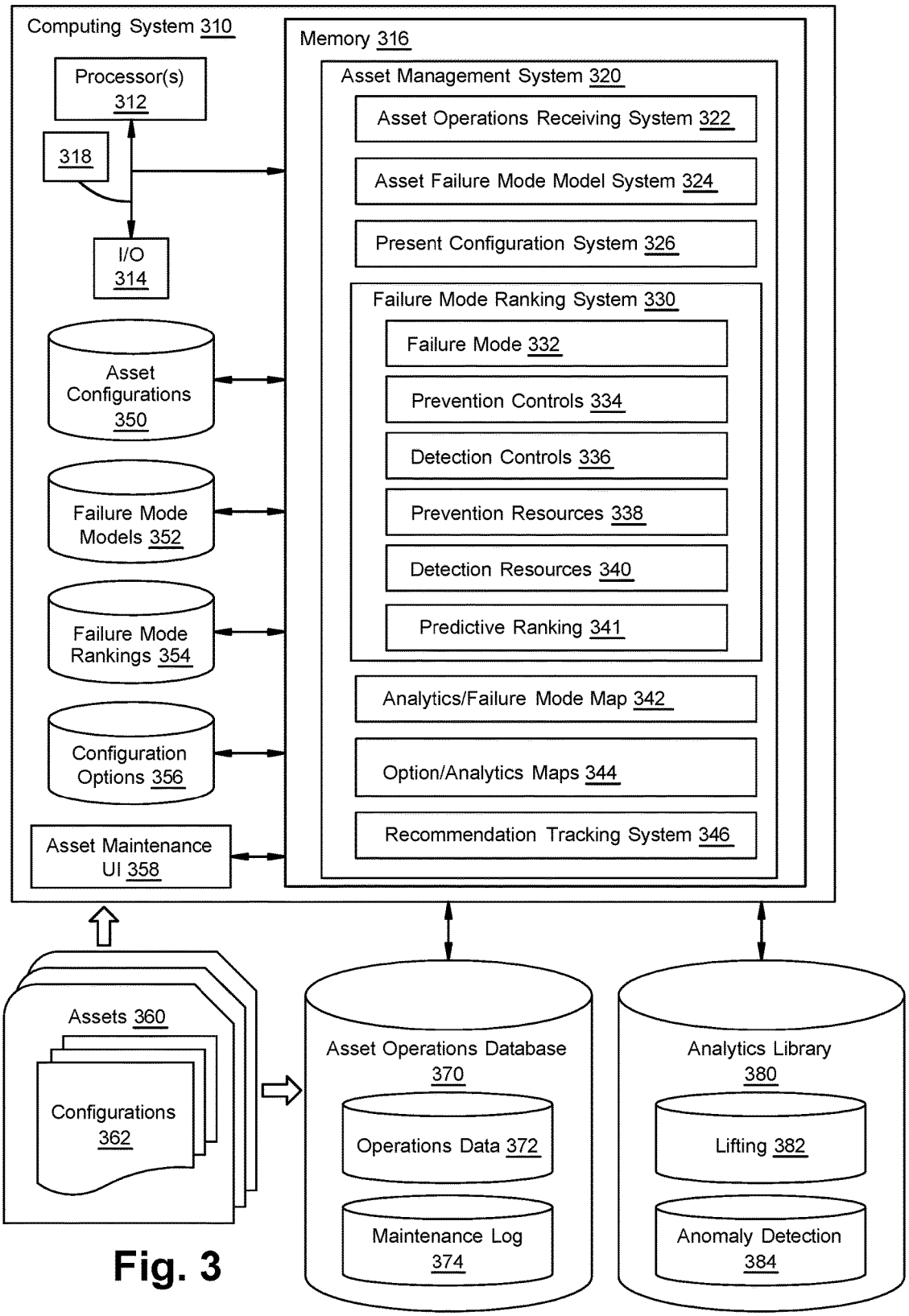
FIG. 3 shows a diagram of an example system for managing a group of assets.

FIG. 3 shows an example computing system 310 such as may be used as a processing subsystem in the embodiments of FIG. 1 and FIG. 2 for managing assets. Computing system 300 includes processor(s) 312, input/output devices (I/O) 314, and memory 316 interconnected by a communication bus 316. As described above with regard to processing subsystem 26 in FIG. 1, those of ordinary skill in the art will appreciate the many combinations of conventional computer system components that may be used to implement computing system 310. Computing system 310 is associated with a plurality of assets 360 which it may manage. Assets 360 may be co-located with computing system 310 or may be remote from assets 360 and receive data related to asset configurations 362 and asset operations data indirectly. For example, asset configurations 362 may be provided to computing system 310 through direct input, removable media, or network communications and stored in an asset configuration repository 350 while operations data is accessed through a shared asset operations database 370.

An asset management system 320 instantiated in the memory 306 enables management of assets 360 based on a variety of data resources received by or accessible to the computing system 310. In one embodiment, asset management system 320 and its components are implemented in one or more executable software applications and related runtime environments and data structures. While asset management system 312 is shown in the context of a single computing device 310, those of ordinary skill in the art will understand that its functions may be split across multiple computing devices. In one embodiment, some or all functions of asset management system 320 are components of a general asset management software package, while some functions may be part of another software package or extension specifically for addressing the use of certain analytics and dynamic failure mode ranking based on present and possible configurations of assets and sensors.

An asset operations receiving system 322 is configured to receive operations data relevant to assets 360 being managed by asset management system 320. Asset operations receiving system 322 may receive continuous or periodic updates of operational data from one or more data sources accessible to computing system 310. In some embodiments, asset management system 320 may receive continuous operational data from assets 360 to perform operational control and monitoring functions independent of the maintenance recommendation functions described herein. In some embodiments, asset management system 320 may access an asset operations database 370 to access relevant operations data as needed. For example, operations data collected from assets 360 and related sensors, measurement systems, and environmental data may be stored in a networked data repository, such as asset operations database 370, for access by multiple computer systems and functions. The operations data may include operating parameters for assets 360 that specifically relate to one or more potential failure modes. Sensor output from assets 360 can include continuous or intermittent data accumulated either directly from a sensor or a model calculated from those sensors. Such values can include temperature, pressure, speed, chemical composition, etc. The relevant operations data may be called, received, or organized by asset operations receiving system 322 into one or more databases with appropriate key fields for use in relational database management as operational data elements.

An asset failure mode model system 324 is configured to receive failure mode models relevant to the assets 360 being managed by asset management system 320. Asset failure mode model system 324 may access a plurality of failure mode models stored in a data repository accessible to computing system 310, such as a failure mode models 352 stored in a data repository in computing system 310. In some embodiments, a plurality of failure mode models will have been developed for a given class of assets and components thereof and may continue to be developed and refined over the life of the assets as more engineering and field data is collected from the operation of similar assets. Failure mode models express the probability of occurrence of a particular event depending on the failure mode specified. This includes examples such as Survival Model, Neural Net Model, or Logistic Model for example. For example a car engine oil system can have a failure mode expressed in terms of probability of failure (permanent engine damage) due to Oil Contamination as a result of an Oil Change as well as probability of failure (permanent engine damage) resulting from failure to change the oil and subsequent oxidation. Asset failure mode model system 324 may access failure mode models 352 as a local data resource that receives periodic updates or through access to a networked data repository for developing and maintaining such models. Failure mode models 352 may be called, received, or organized by asset failure mode model system 324 into one or more databases with appropriate key fields for use in relational database management as failure mode model elements.

A present configuration system 326 is configured to receive and maintain configuration data relevant to the assets 360 being managed by asset management system 320. Present configuration system 326 may access one or more data sources describing configurations 362 of the assets 360 stored in a data repository accessible to computing system 310, such as asset configurations 350 stored in a data repository in computing system 310. In some embodiments, relevant configuration information will have been recorded when the asset was constructed or placed in the field, creating configuration data such as asset class, model, sizing, operating ranges, installed options, installed upgrades, installed sensor packages, and other information describing the asset. In some embodiments, the initial configurations are updated periodically as maintenance, repair, or upgrades change the present configuration of assets 360. Present configuration system 326 may access asset configurations 350 as a local data resource that receives periodic updates or through access to a networked data repository for managing and maintaining accurate descriptions of assets configurations in the field. Asset configurations 352 may be called, received, or organized by present configuration system 326 into one or more databases with appropriate key fields for use in relational database management as asset configuration data elements.

A failure mode ranking system 330 is configured to organize and rank failure modes 332 relevant to the assets 360 being managed by asset management system 320. Failure mode ranking system 330 connects data elements received or accessed by asset operations receiving system 322, asset failure mode model system 324, and present configuration system 326 to enable ranking of potential failure modes 332 using failure mode models 352 for asset configuration 350 based on operations data 372. In some embodiments, failure mode ranking system 330 creates and maintains failure mode rankings 354 in a data repository accessible to computing system 310. Failure mode ranking system 330 further includes access to analytics resources to improve the ranking of the various potential failure modes and integrate present prevention controls 334 and detection controls 336 and prevention resources 338 and detection resources 340 that could be added to the present configuration. In some embodiments, prevention resources 338 and detection resources 340 may be used by failure mode ranking system 330 to calculate one or more predictive rankings 341, whereby the rank of failure mode 332 is recalculated based upon an asset configuration modified with one or more options, such as the installation or activation of prevention resources 338 and/or detection resources 340. This enhanced failure modes and effect analysis enables ranking of configuration options 356 in addition to present asset configurations 350 for generating asset maintenance output through asset maintenance user interface (UI) 358. Failure mode ranking system 330 may access an analytics library 380 for improving the ranking process with additional analytical data, more specifically, failure prevention analytics. For example, analytics library 380 may include lifing analytics 382 that provide predictive operational and component wear models for different asset configurations and operational parameters that may be relevant to one or more failure mode models. In another example, analytics library 380 may include anomaly detection analytics 384 that provide predictive event and failure models for different asset configurations and anomalies extracted from operational data that may be relevant to one or more failure mode models. The additional analytical data may be accessed, received, or organized by failure mode ranking system 330 in failure prevention analytics configurations. The failure prevention analytics configurations may include a plurality of elements describing the asset configurations, failure mode models, and operational parameters relevant to calculating and using the analytics and the output of the analytics. In some embodiments, failure mode ranking system 330 is a relational database defining the relationships between and among data elements, such as operational data elements, failure mode model elements, asset configuration data elements, failure prevention analytics configuration elements, and failure mode ranking elements. For example, Oil Oxidation failure mode as described above will be quantified as less likely than Oil Contamination in the example given above.

Asset management system 320 may provide recommendations regarding maintenance and upgrades for assets 360 as asset maintenance output through asset maintenance UI 358 based on the failure mode rankings 354. An analytics to failure mode map 342 may define the relationships between failure prevention analytics configurations and failure modes. More specifically, analytics to failure mode map 342 may enable a potential failure mode to be mapped against analytics for the prevention controls and detection controls most likely to reduce the occurrence or detectability of the failure mode. This relational mapping of failure mode rankings and models to analytics with failure prevention potential both enhances use of presently enabled analytics for management of assets and enables proactive recommendation of upgrades to specifically address high ranking potential failure modes. Maintenance upgrades may include acceleration of normal replacement or other maintenance schedule, proactive replacement of a wear part in which an anomaly has been detected, or a recommended change in operating parameters or the configuration of the asset, such as upgrading a particular component. These configuration options 356 may be mapped directly to the failure mode models with enhanced predictive capabilities enabled by the analytics. These recommended changes can then be included in the asset maintenance output displayed through asset maintenance UI 358.

In some embodiments, the proactive recommendations may include further configuration options based on upgrading sensor packages or other configuration changes to enable additional failure prevention analytics. The asset management system 320 may further include an options to analytics map 344 to define the relationships between failure prevention analytics configuration elements in analytics library 380 and configuration options 356. More specifically, options to analytics map 344 may provide the relationships necessary to identify potential prevention resources 338 and potential detection resources 340 that are compatible with the present asset configurations 350 but not yet enabled by the present configuration. This relational mapping of failure mode rankings and models to analytics with failure prevention potential both enhances use of presently enabled analytics for management of assets and enables proactive recommendation of upgrades to specifically address high ranking potential failure modes. Configuration options 356 may be provided as recommended maintenance upgrades to address specific high-ranking failure modes to decrease their future ranking. These recommended changes can then be included in the asset maintenance output displayed through asset maintenance UI 358.

A recommendation tracking system 346 may be included in asset management system 320 and contribute to asset maintenance output displayed through asset maintenance UI 358 to provide a method of tracking the implementation of recommended configuration changes to address high-ranking risks. More specifically, recommendation tracking system 346 may provide project management tools like time and responsibility tracking. In some embodiments, the recommendation tracking system 346 may include a predictive value of how implementing a recommended configuration change, such as the addition of sensors to enable a new analytics resource, will reduce the risk and failure mode ranking of the related failure mode. Thus a future ranking of select failure modes may be reduced by changing the present configuration of the asset to include and enable a recommended failure prevention analytics configuration. Further, asset operations database 370 may include a maintenance log 374 which may be used by recommendation tracking system 346 to identify when recommended configuration changes have been completed. Maintenance log 374 may also enable asset management system 320 to update asset configurations 350 and configuration options 356 in response to completed configuration changes.

Figure 4:
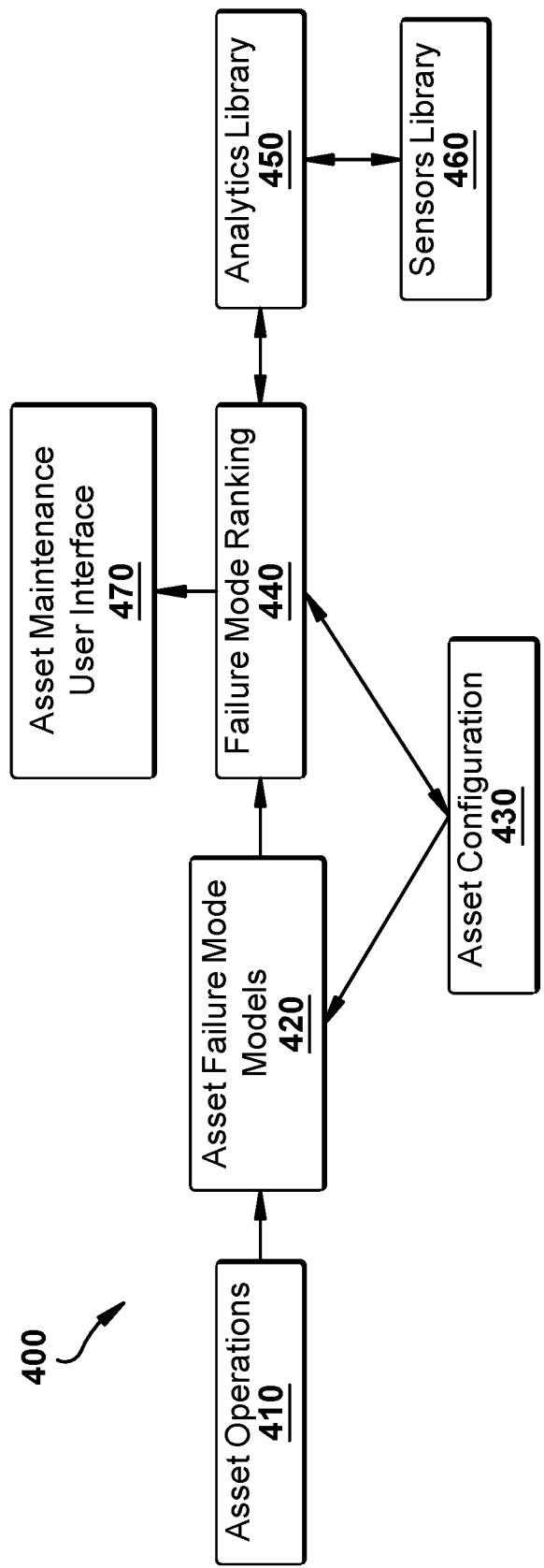
FIG. 4 shows an example relational data structure for managing an asset.

FIG. 4 is an example relational data structure 400 for managing an asset. More specifically, each of the blocks may represent a group of related data elements with one or more key fields and each arrow may represent one or more tables for defining the relationships among elements in each group. The actual data elements and relationships are highly variable based upon the data relevant to the assets, failure modes, analytics, and options available, as well as the ranking methodology implemented in any given system. Presented with the data available in any give asset management context, the specific elements of interest and relationships will be determinable. In the example shown, asset operations elements 410 have defined data relationships to asset failure mode model elements 420. For example, any given failure mode model will be based upon certain operating parameters of the asset being modeled. The asset failure mode models elements 420 also include defined data relationships with asset configuration elements 430. For example, any given failure mode model will also be based upon certain characteristics of the asset itself, such as class, model, size, etc. Asset configuration elements 430 contributes data elements to asset failure mode models elements 420 and failure mode rankings 440. In addition, asset configuration elements 430 may change based on recommended asset maintenance due to failure mode ranking elements 440. Failure mode ranking elements 440 have defined data relationships with asset failure mode models elements 420 and asset configuration elements 430, as well as analytics library elements 450. For example, analytics library elements 450 may include failure prevention analytics configuration elements that can be used to both calculate failure mode rankings and provide recommendations improving configuration and related analytics options. In turn, analytics library elements 450 may be related to sensors library 460 as an example of configuration options for improving analytics. In some embodiments, failure mode ranking elements 440 may be mapped to asset maintenance user interface elements 470 to determine what failure mode ranking elements 440 are available to a user as part of an asset maintenance output. As discussed above with regard to FIG. 3, explicit maps of any of these relationships, such as analytics to failure mode map 342 or options to analytics map 344 may be implemented in an asset management system to implement the described relational database structure 400. Note that in the example provided, such mappings exist between asset operations and failure mode models and other relationships, but may already be present in pre-existing systems.

Figure 5:
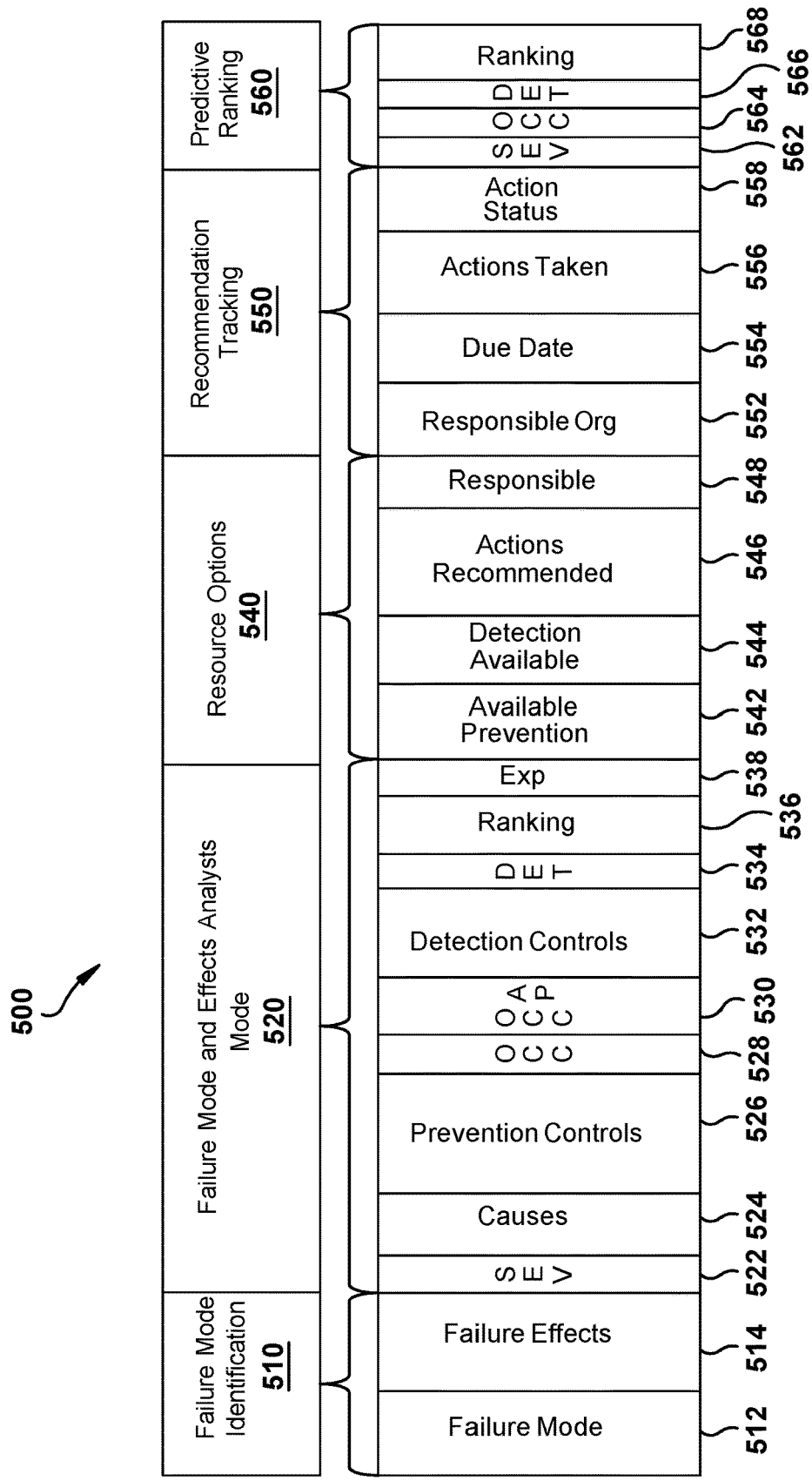
FIG. 5 shows an example asset management output field structure.

FIG. 5 example asset management output field structure 500. For example, the asset maintenance output displayed through asset maintenance UI 358 in FIG. 3 may be presented in such a structure to a user or for use by another function or computing system. Output field structure 500 includes failure mode identification fields 510, failure mode and effects analysis (FMEA) fields 520, resource options fields 540, recommendation tracking fields 550, and predictive ranking fields 560. Failure mode identification fields 510 may include failure mode name field 512 and failure effect field 514. For example, failure mode name field 512 may identify what failure mode is under investigation and failure effects field 514 may identify the implications as a result of the failure mode, documenting the effect on component, subsystem, or system. FMEA fields 520 may include severity field 522, causes field 524, prevention controls field 526, occurrence field 528, occurrence after prevention field 530, detection controls field 532, detection field 534, ranking field 536, and experience field 538. For example, severity field 522 may rate or describe how severe the effects of the failure are and causes field 524 may describe what causes the failure mode to occur. Prevention controls field 526 may describe what prevention controls are currently in place from the perspective of the current planned maintenance activity schedule and operational parameters, like modes and limits. Occurrence field 528 may describe how often the cause or failure mode occurs and occurrence after prevention field 530 may describe how often the cause or failure mode occurs based on the current planned prevention controls. Detection controls field 532 may describe what the existing detection controls (monitoring, inspection, and test) are that enable the causes or failure mode to be detected such that they can be prevented and detection field 534 may rate or describe whether or how likely detection is under the current detection controls. Ranking field 536 is a synthesis of the other FMEA fields 520 based on the failure mode model and related data to provide a numerical ranking of the failure mode relative to other potential failure modes for the asset and/or a relative scale for action thresholds to identify various risk levels that could require immediate preventative maintenance or even shutdown or disposal of the asset, as well as lesser rankings for maintenance and upgrade prioritization. Experience field 538 may identify whether a particular fleet, business unit, company, or other organizational grouping has direct experience with the failure mode, such as whether it has occurred in assets under their management before. Resource options fields 540 may include prevention available field 542, detection available field 544, actions recommended field 546, and responsibility field 548. For example, prevention available field 542 may include options for additional prevention controls achieved through changing the asset configuration, such as hardware modification, replacement, or change in operational parameters. Detection available field 544 may include options for additional detection controls, such as monitoring, inspection, and test options that enable failure prevention analytics, including detection options that may require installation of additional sensors or similar upgrades. Actions recommended field 546 may use an iterative analysis of ranking changes, cost/benefit analysis, or a combination thereof to determine what new prevention and/or detection controls are recommended to mitigate the failure mode and thereby lower the ranking of the failure mode in the future, such as recommended design changes, additional inspection or testing, or new sensors and analytics to improve monitoring. Responsibility field 548 defines responsibility for the recommended action and may enable an alert or messaging to the responsible party for failure modes achieving a predetermined ranking threshold. Recommendation tracking fields 550 may include responsible organization field 552, due date field 554, actions taken field 556, and action status field 558. Predictive ranking fields 560 may include recalculated severity field 562, recalculated occurrence field 564, recalculated detection field 566, and recalculated ranking field 568. Responsible organization field 552 may track the organization that has taken responsibility for implementing the recommended actions and due date field 554 may track the date the organization has committed to for implementing the recommended actions. Actions taken field 556 may summarize any actions taken, including dates completed, related to remediating the failure mode and action status field 558 may indicate whether the recommended actions are on track, such as closed, working, or not planned. The recalculated fields are simply recalculations of the respective FMEA fields 520 with the recommended actions implemented. For example, recalculated ranking field 568 may include a recalculated ranking with all recommended actions completed. In another embodiment, recalculated fields may be provided for each recommended action and may include separate values for recommended actions completed and recommended actions to be completed in the future. Note that output field structure 500 is provided as an example only to assist with understanding how the relational data models and functions described above may generate an actionable output by integrating analytics and configuration options to improve the function of asset management systems.

The foregoing drawings show some of the operational processing associated according to several embodiments of this disclosure. It should be noted that in some alternative implementations, the acts described may occur out of the order described or may in fact be executed substantially concurrently or in the reverse order, depending upon the act involved.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system comprising:
  a plurality of sensing devices configured to generate operational data indicative of a plurality of operating parameters for an asset; and
  a computing system in communication with the plurality of sensing devices for receiving the operational data, the computing system including:
    a plurality of failure mode models stored in at least one data repository accessible to the computing system and describing a plurality of potential failure modes of a class of assets including the asset;
    asset configuration data stored in the at least one data repository accessible to the computing system and describing at least a present configuration of the asset;
    an analytics library stored in the at least one data repository accessible to the computing system and providing a plurality of failure prevention analytics configurations, at least one of the plurality of failure prevention analytics configurations describing detection and prevention resources associated with at least one of the described plurality of potential failure modes of the class of assets including the asset;
    a failure mode ranking system accessed by the computing system and using the operational data, the asset configuration data, and the plurality of failure prevention analytics configurations provided by the analytics library to rank the plurality of potential failure modes by a severity of failure, the ranked plurality of potential failure modes including the at least one associated failure prevention analytics configuration;

relationship data including a plurality of relationships among the operational data, the plurality of failure mode models, the asset configuration data, the plurality of failure prevention analytics configurations, and the failure mode ranking system; and an asset maintenance output generated by the computing system using the failure mode ranking system to reduce a future ranking of at least one of the plurality of potential failure modes by changing the present configuration of the asset to include a recommended failure prevention analytics configuration.

2. The system of claim 1, wherein the plurality of failure prevention analytics configurations includes a plurality of lifing analytics.

3. The system of claim 1, wherein the plurality of failure prevention analytics configurations includes a plurality of anomaly detection analytics.

4. The system of claim 1, wherein the failure mode ranking system includes at least one prevention control field and at least one detection control field based on the present configuration of the asset.

5. The system of claim 4, wherein the failure mode ranking system uses an available prevention resource not included in the present configuration of the asset and the at least one associated failure prevention analytics configuration to rank the plurality of potential failure modes and the asset maintenance output includes a recommendation to add the available prevention resource to the present configuration of the asset.

6. The system of claim 4, wherein the failure mode ranking system uses an available detection resource not included in the present configuration of the asset and the at least one associated failure prevention analytics configuration to rank the plurality of potential failure modes and the asset maintenance output includes a recommendation to add the available detection resource to the present configuration of the asset.

7. The system of claim 1, further comprising a relational database map between the plurality of failure mode models and the plurality of failure prevention analytics configurations.

8. The system of claim 1, further comprising:

a configuration options library stored in the at least one data repository accessible to the computing system and including a plurality of sensor options for the class of assets including the asset; and a relational database map between the plurality of sensor options and the plurality of failure prevention analytics configurations.

9. The system of claim 1, further comprising a recommendation tracking system accessed by the computing system and using the asset management output and a maintenance log for the asset to determine when the present configuration of the asset is changed to include the recommended failure prevention analytics configuration.

10. A computing system comprising:
a relational database structure including:

a plurality of operational data elements stored in at least one data repository accessible to the computing system and indicative of a plurality of operating parameters for an asset;

a plurality of failure mode model elements stored in at least one data repository accessible to the computing system and describing a plurality of potential failure modes of a class of assets including the asset;

a plurality of asset configuration data elements stored in at least one data repository accessible to the computing system and describing at least a present configuration of the asset;

a plurality of failure prevention analytics configuration elements stored in the at least one data repository accessible to the computing system and describing detection and prevention resources associated with the plurality of potential failure modes of the class of assets including the asset;

a plurality of failure mode ranking elements stored in at least one data repository accessible to the computing system and ranking the plurality of potential failure modes by a severity of failure, the ranked plurality of potential failure modes includes the associated failure prevention analytics configuration elements; and a plurality of relationships among the plurality of operational data elements, the plurality of failure mode model elements, the plurality of asset configuration data elements, the plurality of failure prevention analytics configuration elements, and the plurality of failure mode ranking elements; and an asset management system implemented by the computing system and using the relational database structure to generate an asset maintenance output reducing a future ranking of at least one of the plurality of potential failure modes by changing the present configuration of the asset to include a recommended failure prevention analytics configuration.

11. The computing system of claim 10, wherein the plurality of failure prevention analytics configuration elements includes a plurality of lifing analytics.

12. The computing system of claim 10, wherein the plurality of failure prevention analytics configuration elements includes a plurality of anomaly detection analytics.

13. The computing system of claim 10, wherein the plurality of failure mode ranking elements includes at least one prevention control field and at least one detection control field related to at least one of the plurality of asset configuration data elements representing the present configuration of the asset.

14. The computing system of claim 13, wherein the asset management system uses an available prevention resource not included in the present configuration of the asset and the associated failure prevention analytics configuration element including the available prevention resource to rank the plurality of potential failure modes and the asset maintenance output includes a recommendation to add the available prevention resource to the present configuration of the asset.

15. The computing system of claim 13, wherein the asset management system uses an available detection resource not included in the present configuration of the asset and the associated failure prevention analytics configuration element including the available prevention resource to rank the plurality of potential failure modes and the asset maintenance output includes a recommendation to add the available detection resource to the present configuration of the asset.

16. The computing system of claim 10, wherein the plurality of relationships include a relational database map between the plurality of failure mode models and the plurality of failure prevention analytics configurations.

17. The computing system of claim 10, wherein the relational database structure further includes a plurality of sensor option elements stored in the at least one data repository accessible to the computing system and wherein the plurality of relationships include a relational database map between the plurality of sensor option elements and the plurality of failure prevention analytics configuration elements.

18. The computing system of claim 10, wherein the asset management system further comprises a recommendation tracking system using the asset management output and a maintenance log for the asset to determine when the present configuration of the asset is changed to include the recommended failure prevention analytics configuration.

19. An asset management system operating in a memory of a computing system, the asset management system comprising:
- an asset operations receiving system configured to receive operational data indicative of a plurality of operating parameters for an asset;
- an asset failure mode model system configured to access a plurality of failure mode models stored in at least one data repository accessible to the computing system and describing a plurality of potential failure modes of a class of assets including the asset;
- a present configuration system configured to access asset configuration data stored in the at least one data repository accessible to the computing system and describing at least a present configuration of the asset;
- an analytics system including an analytics library stored in the at least one data repository accessible to the computing system and providing a plurality of failure prevention analytics configurations, at least one of the plurality of failure prevention analytics configurations describing detection and prevention resources associated with at least one of the described plurality of potential failure modes of the class of assets including the asset;
- a failure mode ranking system configured to access the plurality of failure prevention analytics configurations associated with the plurality of potential failure and use the operational data, the asset configuration data, and the plurality of failure prevention analytics configurations to rank the plurality of potential failure modes by a severity of failure, the ranked plurality of potential failure modes including the associated failure prevention analytics configurations;
- a relationship system including relationship data stored in the at least one data repository accessible to the computing system, the relationship data including a plurality of relationships among the operational data, the plurality of failure mode models, the asset configuration data, the plurality of failure prevention analytics configurations, and the failure mode ranking system; and
- wherein the failure mode ranking system generates an asset maintenance output to reduce a future ranking of at least one of the plurality of potential failure modes by changing the present configuration of the asset to include a recommended failure prevention analytics configuration.

20. The asset management system of claim 19, wherein the failure prevention analytics configurations are related to a plurality of sensor options stored in the at least one data repository accessible to the computing system, and the asset management system further comprises a relational database map between the plurality of sensor options and the plurality of failure prevention analytics configurations and the recommended failure prevention analytics configuration includes addition of at least one sensor to the asset.

* * * * *